United States Patent [19]
Erdell

[11] 3,835,781
[45] Sept. 17, 1974

[54] METHOD FOR OBTAINING PHOTOGRAPHIC REPRODUCTIONS IN COLOR

[76] Inventor: John Buckland Erdell, 50 Morningside Dr., Brooklyn, N.Y. 10025

[22] Filed: Mar. 13, 1972

[21] Appl. No.: 233,944

[52] U.S. Cl. ................................. 101/464, 96/30
[51] Int. Cl. ........ B41m 5/00, B41n 3/00, G03f 1/00
[58] Field of Search ................... 96/27 E, 27 R, 30; 35/28.3; 356/175; 101/464

[56] References Cited
UNITED STATES PATENTS

| | | | |
|---|---|---|---|
| 1,597,830 | 8/1926 | Rueger | 35/28.3 |
| 1,612,791 | 1/1927 | Ames et al. | 35/28.3 |
| 1,618,533 | 2/1927 | Hutchison | 96/30 |
| 1,703,449 | 2/1929 | Huebner | 96/30 |
| 1,860,912 | 5/1932 | Troland | 101/464 |
| 2,446,193 | 8/1948 | Rice | 96/30 |
| 2,484,322 | 10/1949 | Sweet | 356/175 |
| 2,537,924 | 1/1951 | Weyerts | 101/464 |

*Primary Examiner*—David Klein
*Attorney, Agent, or Firm*—Stoll and Stoll

[57] ABSTRACT

Process for exhibiting and evaluating the effects of variation in dye concentration on the saturation and hue of dyes useful in color photography, dye imbibition transfer processes. The process comprises preparing a crossed step wedge on a dye transfer matrix film, dyeing the processed matrix in a given transfer dye solution, and transferring the crossed step wedge dye images to a reception material. The density, saturation and hue of any individual step of the transferred dye images is referenced to any other step of the positive dye wedge by relative exposure indicia in each step. The crossed step wedge dye positive serves as a relative exposure guide for producing positive color prints from non-color negatives using imbibition dye transfer processes.

4 Claims, 4 Drawing Figures

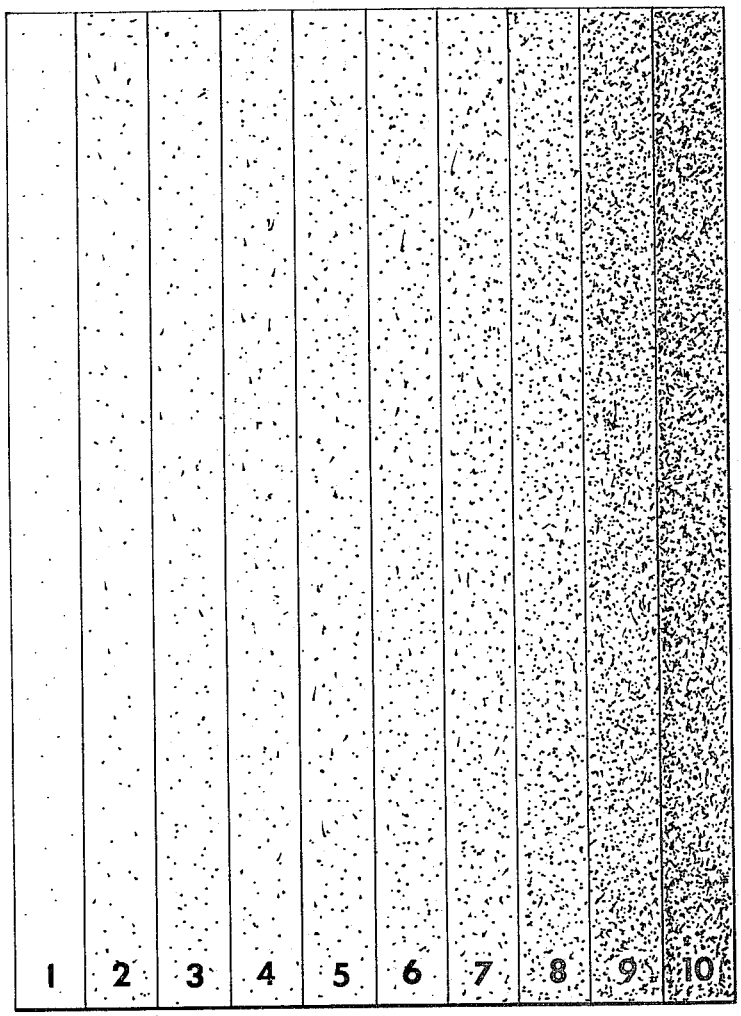

METHOD FOR OBTAINING PHOTOGRAPHIC REPRODUCTIONS IN COLOR

BACKGROUND OF THE INVENTION

1. Field of the Invention

The present invention relates to color photography and to dye imbibition transfer processes for obtaining colored photographic reproductions.

2. Description of the Prior Art

The art of color photography is more than a hundred years old and has produced literally thousands of publications, including patents, on processes, materials, and equipment for producing photographic reproductions in color. By far, the principal aim of all the prior endeavor has been to improve materials and processes for obtaining as nearly natural color photographs as possible. But along with attaining the goal of truly natural color photographs there exist needs for producing less than truly natural color in photographic reproductions of colored originals. Moreover, there are needs for obtaining photographic reproductions in colors which are entirely unrelated to the color, or colors, of the original subject. Color photographs wherein the colors of the reproductions are at the option of the photographer can be regarded as derivations from orthodox, natural color photography whose aim is to obtain as nearly faithful chromatic rendition of the colors of the original subject as is possible with the materials available. My co-pending patent application, Ser. No. 139,694, filed May 3, 1971, now U.S. Pat. No. 3,709,686, issued Jan. 9, 1973, describes and claims methods for producing derivations of color photography reproductions wherein the dye-forming materials are contained in and constitute part of the light-sensitive photographic recording materials themselves.

While the range of colors capable of being photographically reproduced with some degree of color saturation and hue by the method and materials of pending application Ser. No. 139,694 is sufficient to meet most needs, the method is still limited principally to the color-forming capabilities built into the light-sensitive coatings by the manufacturers thereof.

It is well known, however, that the saturation and hue of the dye images produced by such color-forming light-sensitive photographic elements can be varied over a considerable range by altering the chemical constitution of the chromogenic developing agents used in color-forming development processes. Many chemically different chromogenic developing agents are commerically available such as, N,N-Diethyl-p-phenylenediamine Monohydrochloride, 2-Amino-5-diethylaminotoluene Monohydrochloride, 4-Amino-N-ethyl-N-[B-methanesulfonamidoethyl]-m-toluidine sesquisulfate Monohydrate, and 4-Amino-3-methyl-N-ethyl-N-[B-Hydroxethyl]-aniline Sulfate, to mention only a few. However, the range in color image saturation and possible by-change in the chemical structure of chromogenic developing agents still leaves unchanged the other component in the dye forming reaction, namely, the color former contained in the manufactured light-sensitive elements. Thus, the problem of obtaining the widest possible range of saturation and hue of the dye images produced in color photography derivation processes, requires some other source of dyes for images than dye-forming development.

SUMMARY OF THE INVENTION

An object of this invention is to provide a method for producing colored photographic reproductions of non-colored originals.

A further object of this invention is to provide an improved dye transfer method for producing two or more differently colored photographic reproductions of the same non-colored original.

A still further object of this invention is to provide a photographic dye transfer method for preparing a graduated step wedge showing the variation in saturation and hue of a given transfer dye with known variation in exposure of the imbibition matrix.

Still another object of the present invention is to provide a method for producing colored photographs by dye transfer processes using a graduated step wedge of the dyes to determine the exposure of the imbibition matrix required to produce the desired color.

This invention has as another prime object to provide a method for testing and exhibiting the color, hue and saturation characteristics of dyes useful in dye imbibition transfer processes.

In accordance with this invention the above and other objects are achieved by

1. Preparing a density step wedge transparency by photographing a reflectance gray scale
2. Photographically cross-printing the step wedge transparency onto a wash-off imbibition dye transfer matrix film to produce a cross step wedge matrix
3. Preparing a master color step chart for a given dye from the exposed dye transfer matrix, each step of the master dye color chart bearing a number which indicates the exposure given any dye step in relation to all other steps in the chart. Thus all the dye steps with the same number received the same exposure. The difference between the numbers indicates the difference in exposures, in terms of arithmetical increments of 2, given the respective steps.
4. Exposing a black-and-white negative of an original to a wash-off matrix film in accordance with the relative exposure received by a selected step of the master dye image positive.

Steps (1), (2) and (3) along with variations in concentration of the dye solutions, time of imbibition contact and amount of acetic acid present during transfer will produce a wide range of color saturation and hue in the dye image steps of the master dye image positive.

BRIEF DESCRIPTION OF THE DRAWING

FIG. 1 is a paper gray scale or step wedge comprising a total of 10 narrow, rectangular density areas ranging from the low density or white area, through increasing density areas to black.

FIG. 2 is a copy of the master gray scale photographed on film and reduced in size so that it can be accommodated in the film holder of an enlarger.

Figure 3:
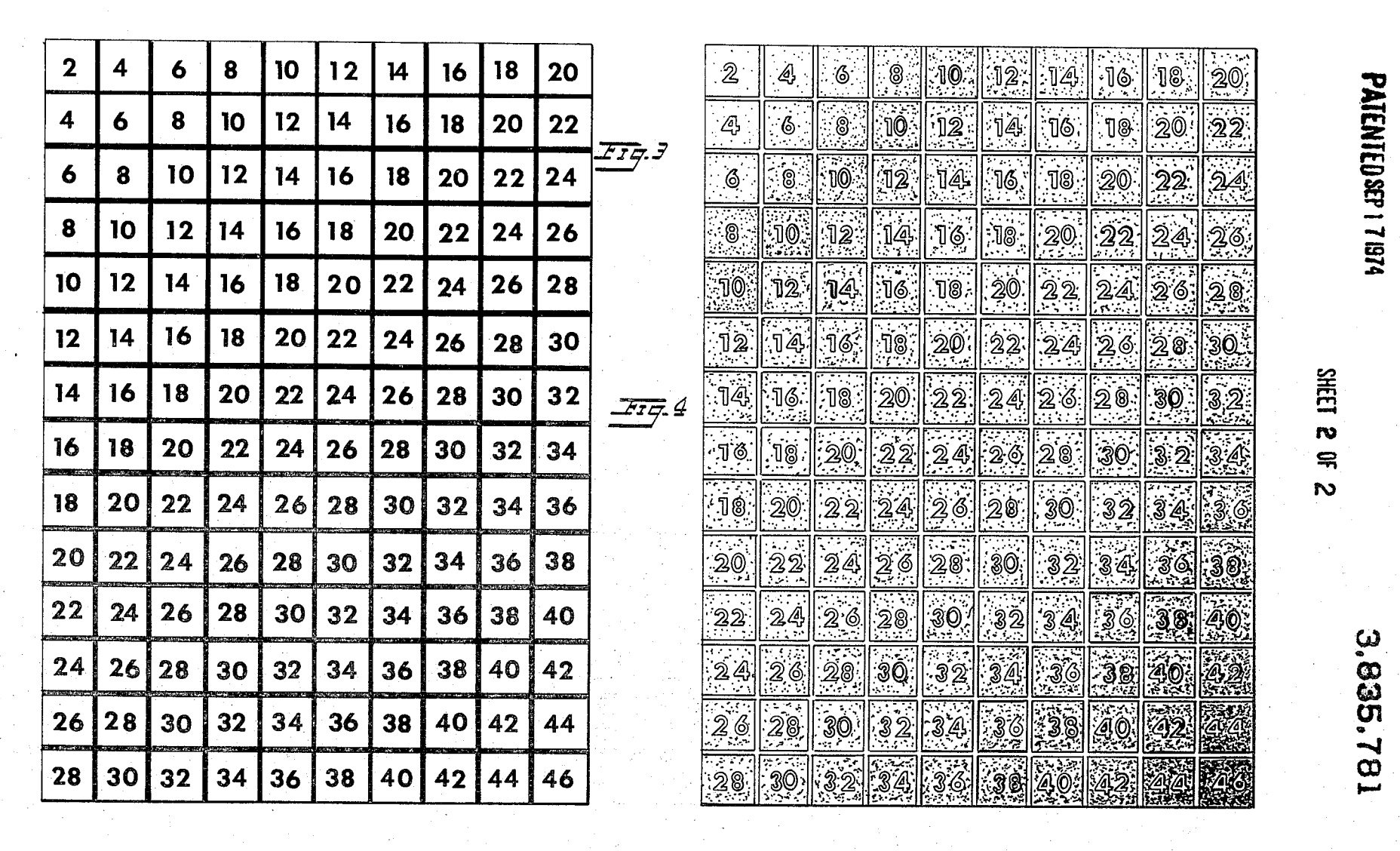

FIG. 3 is an indiciated film grid overlay.

FIG. 4 is a processed, wash-off imbibition matrix which has been exposed by projecting the film copy of the master gray scale through the indiciated grid and onto the light-sensitive matrix film.

DESCRIPTION OF A PREFERRED EMBODIMENT OF THE INVENTION

As indicated in the foregoing, the first step in the present method is the production of a black-and-white photographic negative of the original it is desired to reproduce as a colored positive print. The original may be a natural scene, a black-and-white continuous tone photograph, a discontinuous tone, dot-screen reproduction, a chart, graph, engineering drawing, or other black-and-white, two-dimensional visual communication.

With a black-and-white photographic negative at hand, the next step is to make a dye transfer print of the negative showing the imbibition transfer printing characteristics for the dye chosen for the colored reproductions. To enable a selection to be made of the imbibition dye image variations possible with a given dye, a master color step chart is prepared for the dye as follows:

1. A paper gray scale or step wedge is obtained by sequentially exposing equal, successive areas of photographic paper, each area being exposed for the same length of time as the preceding area except that a final area along one lengthwise side of the paper receives no exposure. The paper is then processed as usual, dried and used as a master step wedge or gray scale. Suitable gray scales may also be constructed by adhesively securing parallel strips of paper each strip being of a different neutral density or gray and with the total of nine strips and the white paper margin covering a range of about 0.01 to 1.20 in reflectance density. Suitable paper gray scales are also available from photographic supply manufacturers.

2. The gray scale is then photographed in reduced size on film to obtain a negative transparency of the scale. Alternatively, both steps of constructing the paper gray scale and making a photographic film copy of the gray scale can be eliminated by obtaining a photographic film step wedge or tablet from a photographic material manufacturer.

3. The film step wedge is then projection printed through an indiciated film grid overlay, then through the film support of a wash-off matrix film and finally onto the light-sensitive coating thereof in a step-wise manner across the matrix film to produce an extended or crossed step wedge. To produce an extended or crossed step wedge matrix film the grid over the film is completely covered with an opaque mask or card having first focused the step wedge on the matrix film. The mask is then moved to uncover and expose the first or lowest numbered areas 2 to 20 for 2 seconds. The mask is then shifted to uncover the next row of areas, 4 to 22, for 2 seconds. In the same manner each row of numbered or indiciated areas across the grid is successively exposed for 2 seconds across the width of the matrix film to produce latent images of a crossed or extended step wedge. The matrix film is then developed, fixed, washed-off, dyed, and brought into transfer contact with mordanted reception paper and then separated when the dye has transferred from the matrix to the reception material.

If a step wedge of 10 steps is exposed, step-wise across the matrix film as described, the matrix will contain 140 steps representing a range in exposure of from 2 to 46, that is, the highest exposure will have been 23 times the lowest exposure. Since the amount of dye transferred to the reception coating from any given area of the matrix is proportional to the thickness of the gelatin coating of that area which, in turn, is proportional to the exposure received by that area of the matrix, the dye densities of the imbibition transfer positive will range from highly saturated to weak, diluted images of little hue.

Having prepared a dye image crossed step wedge chart for a given dye, and having determined from the master chart or dye step wedge the dye saturation and hue desired for making colored reproductions, the process is repeated using a negative of the original which is desired to be reproduced in color and, of course, omitting making the crossed step wedge on the matrix material. The negative is exposed onto the matrix for the same conditions of lamp intensity, time, lens stop opening, etc., etc. as were used to make the matrix step which produced the selected dye image step.

The light sensitive matrix materials, processing solutions, dyes, and reception papers and films are commercially available from the Eastman Kodak Company. Detailed instructions for processing the matrices, dyeing, and transferring the dyes to mordanted reception coatings are also available. The processing steps include:

1. Develop exposed matrix
2. Water rinse
3. Fix
4. Wash-off in warm water (120° F)
5. Chill rinse at 68° F
6. Dye matrix in acid dye solution
7. Bathe reception paper in conditioner (5 percent sodium acetate solution)
8. First acid rinse for matrix (1 percent acetic acid solution)
9. Second acid rinse for matrix (1 percent acetic acid solution)
10. Imbibition contact matrix with reception paper, film or other reception material.
11. Separate matrix and reception material
12. Dry reception material and transferred dye image.

Inasmuch as it is an object of the present invention to provide a method for the photographic formation of dye images other than the well known cyan, yellow, and magenta acid dyes, any of the following dyes, or mixtures thereof, may be advantageously used for dyeing wash-off type imbibition dye transfer matrices:

| DYE | COLOR INDEX NUMBER* |
| --- | --- |
| Pontamine Fast Red 8 BLX | 28160 |
| Pontamine Fast Orange | 40265 |
| Fast Red S Conc. | 15620 |
| Congo Red 4BX | 22120 |
| Pontacyl Carmine 6B Extra Conc. | 18055 |
| Pontacyl Scarlet R Conc. | 23910 |
| Pontacyl Rubine R Extra Conc. | 14720 |
| Acid Magenta O | 42685 |
| Pontamine Fast Yellow RL | 29025 |
| Metanil Yellow WS | 13065 |
| Anthracene Yellow GR | 13290 |
| Erie Yellow F Conc. | 40000 |
| Acid Green SN Extra | 44090 |
| Acid Green | 42095 |
| Ink Blue R | 42755 |
| Pontamine Fast Blue 3RLP | 27925 |
| Pontamine Fast Gray | 34170 |
| Alizarine Fast Brown G | 66710 |
| Perlamine Fast Brown 3 GL | 10410 |
| Pontamine Black ULR | 30235 |
| Diamond Acid Black SAS | 27270 |

-Continued

| DYE | COLOR INDEX NUMBER* |
|---|---|
| Acid Black L | 20470 |

* "Colour Index" 2nd Edition, by The Society of Dyers And Colourists (and) The American Association of Textile Chemists and Colorists.

As is well known in wash-off relief dye transfer processes, while the amount of dye transferred to the reception coating is proportional to the thickness of the gelatin matrix image, the absorption of acid dyes to the gelatin image is controlled by the amount of acetic acid in the dye bath. However, the acetic acid tolerance of acid dyes varies substantially; some dyes require considerable acetic acid before precipitation occurs, while others are precipitated by very small concentrations of acetic acid. Precipitation also varies with concentration of the dye solution. Since acetic acid controls the absorption of the dye by the gelatin, it is desirable to extend the range or tolerance of the dyes for acetic acid over a range in concentrations of dye and acid solutions. Buffering solutions such as are widely used in electrometric titrometer and pH determinations provide a ready means for increasing the tolerance of acid dye solutions for acetic acid. The use of such buffer solutions and higher concentrations of acetic acid in the dye solutions increases the absorption of dye by a given thickness of gelatine relief image which, in turn, increases the density of dye transferred to the reception coating. Buffer solutions contain mixtures of a weak acid and its salt or a weak base and its salt.

A common buffer is an aqueous solution of acetic acid and sodium acetate. Acid salts of polybasic acids such as sodium orthophosphate are also highly useful buffers in combination in solution with boric acid or borax. Buffered acid dye solutions suitable for the present method, prepared as suggested by Colton and Thomson, Photo Technique, November 1940, 54–58, are:

| Ink Blue R | 1.3 | grams |
|---|---|---|
| Sodium orthophosphate | 7.5 | grams |
| Borax | 7.0 | grams |
| Distilled water to | 1 | liter |
| Pontacyl Rubine R Extra Conc. | 3.0 | grams |
| Sodium orthophosphate | 12.5 | grams |
| Borax | 5.0 | grams |
| Distilled water to | 1 | liter |
| Anthracene Yellow GR | 2.0 | grams |
| Sodium orthophosphate | 20.0 | grams |
| Borax | 2.2 | grams |
| Distilled water to | 1 | liter |

The above buffered dye solutions produce low density or contrast on the imbibition print coating. If greater dye contrast or dye density is desired 10 to 200 mls. of 5 percent acetic acid should be added to the dye solutions depending upon the desired density of dye image. If it is desired to store the dye solutions about 10 mls. of formalin should be added to each liter of dye solution to increase the shelf life thereof.

As previously mentioned, mixtures of water soluble acid dyes may be used in the present process to form dye images of innumerable variety of colors and hues. The process is also useful for producing dichroic dye images, i.e., images varying from one color in the lower densities to a different color in the higher densities such as, for example, from yellow-to-red with one and the same dyed matrix. Dye baths containing mixtures of dyes suitable for obtaining dichroic yellow-to-red images are as follows:

| Pontachrome BSW (CI 14835) | 0.30 | gms |
|---|---|---|
| Pontacyl Rubine R (CI 14720 | 1.00 | gms |
| Metanil Yellow WS (CI 13065) | 1.30 | gms |
| Potassium citrate | 30 to 60 | gms |
| Water (100° F) to | 1 | liter |

The longer the matrix is in the dye bath the more pronounced is the dichroic effect. Increasing the amount of citrate increases the clarity of the transferred dye image.

An alternate dye bath for dichroic images is:

| Pontacyl Rubine R (CI 14720) | 1.75 | gms |
|---|---|---|
| Metanil Yellow WS (CI 13065) | 1.75 | gms |
| Glacial acetic acid | 10.0 | ml |
| Water to | 1 | liter |

The reception paper to which the dye images are transferred by imbibition contact with the dyed matrix is commercially available as Eastman Kodak Dye Transfer Paper which is a gelatine-coated white paper containing an acid dye mordant in the colloid coating. In lieu of the manufactured dye transfer paper an alternate reception can be prepared by fixing-out unexposed and undeveloped photographic paper in a new hardening fixing bath. The photographic paper may be any except those with a rough surface. Double weight papers are preferred. After fixation and thoroughly washing the paper, the gelatin layer of the former emulsion coating on the paper is mordanted to increase the rate of dye transfer and to minimize lateral diffusion of transferred dye with the resultant loss of dye image sharpness. Suitable mordants for water soluble acid dyes are the oxides and hydroxides of heavy metals such as iron, chromium, copper, tin and aluminum. Since the mordant must be colorless to avoid adulterating the dye color, and must also be capable of being deposited in a gelatin coating on paper or film, one of the most commonly used mordants for acid dyes is aluminum hydroxide, which may be prepared as follows:

| (A) | Aluminum sulfate | 200 | grams |
|---|---|---|---|
| | Water to | 1 | liter |
| (B) | Sodium carbonate, anhy. | 80 | grams |
| | Water to | 1 | liter |

(B) is added to (A) with vigorous stirring to redissolve the precipitate first formed. The fixed and washed photographic paper is bathed in the mordanting solution for 5 minutes, washed for 5 minutes in running water, then bathed for 5 minutes in a 5 percent aqueous solution of sodium acetate and then again washed for 5 minutes. The mordanted and buffered transfer paper may then be used immediately or it may be dried and stored for future use.

Reception materials to which the dye images may be transferred by imbibition contact with dyed matrices include white and colored paper, sheet film, glass, metal such as, for example, aluminum and porcelain, pottery and stoneware. The reception materials should be provided with a layer of gelatin or other natural or synthetic hydroxyl-containing, film-forming colloid which also contains a mordant for water soluble acid dyes. Suitable water-permeable colloids useful as reception layers include agar-agar, albumin, zein, collodion, polyvinyl alcohol, partially hydrolyzed polyvinyl acetate and hydrophilic copolymers thereof with ethylenically unsaturated monomers such as ethylene, vinyl chloride, etc.; polyvinyl acetals, e.g., the acetal of polyvinyl alcohol with acetaldehyde or benzaldehyde; or water soluble or hydrophilic cellulose derivatives. Suitable hydrophilic or water permeable colloids of the above types are described in U.S. Pat. Nos. 2,397,866, 2,286,215, 2,276,323, 2,276,322, 2,211,323 and 2,110,491.

Mordants suitable for fixing the acid dyes transferred to the water permeable colloid coatings on the reception materials include the metallic oxides and hydroxides previously described and also the polymeric polyamines and polymeric amides prepared as described in U.S. Pat. Nos. 2,753,263, 2,585,583 and 2,495,255 and the copolymeric mordants described in U.S. Pat. No. 2,839,401.

The present invention is particularly useful in providing a process for testing, exhibiting, and comparing the color, saturation, and hue characteristics of water soluble dyes useful in dye transfer imbibition processes for forming dye images from black-and-white photographic record images. In such processes the dye images are formed in reception coatings of gelatin or other water permeable colloids by transfer of dyes thereto in aqueous dispersion form and subsequently drying the reception coatings. It is well known that the color imparted by dyes to wet gelatin or other colloid coatings nearly always changes upon drying. Generally speaking, the reds tend to become bluer and the blues tend to become greener. Also, almost all dyes exhibit the peculiarity of appearing to be mixed with red upon decreasing the concentration of the dye solution or density of the dye image. Thus a dye imbibition print in a gelatin coating may be purple, for example, in the highlights, but appears as pure red in the shadows or higher dye concentration areas. In the case of a cyan blue imbibition print in gelatin the shadows show less of a greenish tinge. In like manner a yellow imbibition print appears orange in the shadows or areas of highest dye densities.

In view of the above described bathochromic and hypsochromic changes in the color of dye images in gelatin coatings upon drying and between the highlight and shadow dye densities in the same monochrome color print, predictions of the actual color of a print based on test exposure strips are not highly reliable and a more accurate method has been desired. The present invention provides the sought after method. To show the color that a given dye, at a given concentration, will produce in a dried dye color print, and at the same time show the bathochromic and hypsochromic shifts in the colors of the lightest and most dense dye areas, the first step is to prepare several crossed wedge wash-off matrices in the manner previously described. For the present purpose, however, it is of paramount importance to ensure that each matrix receives exactly the same treatment not only in exposure but especially the processing should be at the same conditions of time, temperature, and agitation. One of the processed matrices is then dyed in the selected dye solution which may be, for example, one of the buffered dye solutions previously described. The dyed matrix is then acid rinsed and is squeegeed into transfer contact with a conditioned reception paper. After a determined transfer time the matrix and reception sheet are separated and the reception sheet bearing the dye image is dried under controlled conditions of temperature and humidity. If the lowest density area, i.e., area 2 in FIG. 4, is colored, however, weakly, the dye solution is diluted with 25 percent by volume of water and the process is repeated with another matrix and another reception sheet until the least exposed area of the matrix produces no trace of dye or coloration on the dried reception coating. With a dried imbibition color print that shows no color in No. 2 area but some trace of color in the No. 4 area the most dense area represents the color of dye transferred from a matrix dye density 23 times the area of color on the print. Any bathochromic shift (towards the red) or hypsochromic shift (towards the blue) of the dye images will probably be apparent in a dye density range as large as 1 to 23. However, if it is desired to show greater variations in color saturation and hue capable of being produced by a given dye in imbibition transfer prints, greater dye densities can be obtained by a number of steps including:

a. Increasing the cross exposure of the matrix step wedge to, say, factor 4 instead of factor 2.
b. Increasing the developer composition to increase the thickness of the gelatin image on the matrix.
c. Increasing the acetic acid concentration in the rinse bath[s].
d. Increasing the length of time of transfer contact.

In addition to providing a process for testing and exhibiting variations in color, saturation, and hue of dyes suitable for imbibition transfer printing from relief matrices to mordanted reception coatings, the present process is also useful in graphic arts processes for producing copies in two or more colors from the same black-and-white negative, for producing screened and unscreened printing matrix of continuous tone negative, art works, graphs, advertising paste-ups, montages and the like.

The invention has been described in detail with particular reference to preferred embodiments thereof, but it will be understood that variations and modifications may be made within the spirit and scope of the invention as described hereinabove and as defined in the appended claims.

What is claimed is:

1. In imbibition dye transfer photographic processes, the process for exhibiting changes in color saturation and hue of dyes with changes in the density of the dye images, and for producing imbibition dye transfer prints comprising:

a. preparing a density step wedge transparency by photographing a reflectance gray scale,
b. photographically cross-printing the step wedge transparency onto a first wash-off imbibition dye transfer matrix film to produce a cross step wedge matrix,
c. preparing a master color step chart for a given dye from the exposed first dye transfer matrix, each step having its relative exposure indicated thereon,
d. exposing a black-and-white negative of an original to a second wash-off imbibition dye transfer matrix film in accordance with the relative exposure received by a selected step of the master dye color chart,
e. processing and dyeing the second matrix in a transfer dye solution, f. contacting the second matrix and a second reception material in imbibition transfer contact to transfer the dye image to said second reception material to form a color positive of the black-and-white negative, and g. separating the contacted materials.

2. The process of claim 1, wherein:

a. the first and second matrixes are dyed in acid dye solutions, and b. the dye transfer steps from the first and second matrixes to the first and second reception materials are performed in an acid environment, c. whereby varying the acidity in the dyeing and transferring steps produces variations in color saturation and hue.

3. The process of claim 1, wherein variations in color saturation and hue are produced in the transferred dye images in the first and second reception materials by varying at least one of the following elements:

a. concentration of the dye solutions, and b. duration of imbibition contact.

4. The process of claim 1, wherein the transfer dyes are selected from the group consisting of the following dyes indexed by The Society of Dyers and Colourists and The American Association of Textile Chemists and Colorists:

| DYE | COLOR INDEX NUMBER |
| --- | --- |
| Pontamine Fast Red 8 BLX | 28160 |
| Pontamine Fast Orange | 40265 |
| Fast Red S. Conc. | 15620 |
| Congo Red 4BX | 22120 |
| Pontacyl Carmine 6B Extra Conc. | 18055 |
| Pontacyl Scarlet R Conc. | 23910 |
| Pontacyl Rubine R Extra Conc. | 14720 |
| Acid Magenta O | 42685 |
| Pontamine Fast Yellow RL | 29025 |
| Metanil Yellow WS | 13065 |
| Anthracene Yellow GR | 13290 |
| Erie Yellow F Conc. | 40000 |
| Acid Green SN Extra | 44090 |
| Acid Green | 42095 |
| Ink Blue R | 42755 |
| Pontamine Fast Blue 3RLP | 27925 |
| Pontamine Fast Gray | 34170 |
| Alizarine Fast Brown G | 66710 |
| Perlamine Fast Brown 3GL | 10410 |
| Pontamine Black ULR | 30235 |
| Diamond Acid Black SAS | 27270 |
| Acid Black L | 20470 |

\* \* \* \* \*